(12) United States Patent
Uno

(10) Patent No.: US 7,979,600 B2
(45) Date of Patent: Jul. 12, 2011

(54) MULTIFUNCTION PERIPHERAL AND DEVICE CONTROL SYSTEM

(75) Inventor: Fumitoshi Uno, Okazaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 44 days.

(21) Appl. No.: 12/055,066

(22) Filed: Mar. 25, 2008

(65) Prior Publication Data

US 2008/0244107 A1    Oct. 2, 2008

(30) Foreign Application Priority Data

Mar. 28, 2007   (JP) ................. 2007-084771

(51) Int. Cl.
*G06F 3/00* (2006.01)
*G06F 13/12* (2006.01)

(52) U.S. Cl. .......................... 710/16; 710/64

(58) Field of Classification Search .......... 710/16, 710/64
See application file for complete search history.

(56) References Cited

U.S. PATENT DOCUMENTS

| | | | | |
|---|---|---|---|---|
| 5,903,733 | A * | 5/1999 | Hong | ............... 709/232 |
| 6,571,293 | B1 | 5/2003 | Hong | |
| 7,111,121 | B2 | 9/2006 | Oishi et al. | |
| 7,346,714 | B2 | 3/2008 | Fukunaga et al. | |
| 7,526,580 | B2 * | 4/2009 | Uno | ............... 710/14 |

FOREIGN PATENT DOCUMENTS

| | | |
|---|---|---|
| CN | 1200512 A | 12/1998 |
| JP | 2001222503 A | 8/2001 |
| JP | 2004-054896 A | 2/2004 |
| JP | 2004-207908 A | 7/2004 |
| JP | 2005175936 A | 6/2005 |
| JP | 2006-079634 A | 3/2006 |
| JP | 2006-178704 A | 7/2006 |
| JP | 2006-293777 A | 10/2006 |

OTHER PUBLICATIONS

Japan Patent Office, Office Action in Japanese Patent Application No. 2007-084771 (counterpart to the above-captioned U.S. Patent Application) mailed Jan. 20, 2009.
The State Intellectual Property Office of the People's Republic of China; Notification of First Office Action in Chinese Patent Application No. 200810087467.9 (counterpart to the above-captioned U.S. patent application) mailed Oct. 9, 2009.
Patent Office of the People's Republic of China; Decision on Rejection for Patent Application No. CN200810087467.9, dated Dec. 3, 2010. (counterpart to above-captioned U.S. patent application).

* cited by examiner

*Primary Examiner* — Henry W Tsai
*Assistant Examiner* — Eric T Oberly
(74) *Attorney, Agent, or Firm* — Baker Botts L.L.P.

(57) ABSTRACT

A multifunction device has a plurality of functions, including at least a data storage function and a function different from the data storage function, and capable of being connected to a computer via a Universal Serial Bus (USB) interface, the multifunction device including: a device data outputting unit that outputs information forcing an OS (operating system) in the computer to recognize the multifunction device as a USB storage class device according to the USB standard when establishing a connection with the computer; and a controlling unit that, when output data including a command in a SCSI-compliant data format is transferred from the computer, determines which one of the plurality of functions the output data is for controlling, based on a value stored in a logic unit number (LUN) field provided in the command.

6 Claims, 12 Drawing Sheets

MULTIFUNCTION PERIPHERAL AND DEVICE CONTROL SYSTEM

CROSS REFERENCE TO RELATED APPLICATION

This application claims priority from Japanese Patent Application No. 2007-84771 filed Mar. 28, 2007. The entire content of this priority application is incorporated herein by reference.

TECHNICAL FIELD

The present invention relates to a multifunction peripheral and a device control system.

BACKGROUND

A multifunction peripheral capable of being connected to a computer or the like via a USB (universal serial bus) interface has been produced commercially. A common configuration for such a multifunction peripheral known in the art includes endpoints for transferring data to a plurality of functions.

However, as the number of functions increases, the number of endpoints also increases, resulting in an expensive hardware construction that increases manufacturing costs for the multifunction peripheral. Hence, this configuration poses difficulties in providing a low-cost multifunction peripheral.

To resolve this problem, Japanese unexamined patent application publications Nos. 2001-222503 and 2005-175936 have proposed techniques for reducing the number of endpoints provided in a multifunction peripheral. The technology in Japanese unexamined patent application publication No. 2001-222503, for example, enables a host device to selectively access a plurality of functions via the same endpoints by emulating a device that disconnects from a device having one function and connects to a device having another function.

The technology described in Japanese unexamined patent application publication No. 2005-175936 reduces the number of endpoints used for transferring data by performing data transfers using a control endpoint provided separately from data transfer endpoints.

However, with the technology disclosed in Japanese unexamined patent application publication No. 2001-222503, the device driver must be switched on the host device side (disabling the driver not being used and loading and enabling the driver to be used) each time one of the functions on the multifunction peripheral is used. Accordingly, considerable time is required for switching device drivers, and two or more functions cannot be used simultaneously.

Further, with the technology disclosed in Japanese unexamined patent application publication No. 2001-222503, when operating one function on the multifunction peripheral, it is not possible to switch to a different function until the operation of the first function is reliably ended. Accordingly, it is difficult to determine a suitable timing for controlling this switch.

In the technology disclosed in Japanese unexamined patent application publication No. 2005-175936, the control endpoint is used for data transfers. Therefore, when a large amount of data is being transferred, this data transfer can interfere with control, making it difficult to perform required control promptly.

Hence, even though the conventional technologies described above can reduce the number of required endpoints, the multifunction peripheral is less user-friendly and may interfere with suitable control.

SUMMARY

In view of the foregoing, it is an object of the present invention to provide a multifunction peripheral capable of reducing the number of endpoints without reducing user-friendliness or interfering with suitable control, and a device control system for controlling the multifunction peripheral.

In order to attain the above and other objects, the invention provides a multifunction device having a plurality of functions, including at least a data storage function and a function different from the data storage function, and capable of being connected to a computer via a Universal Serial Bus (USB) interface, the multifunction device including: a device data outputting unit that outputs information forcing an OS (operating system) in the computer to recognize the multifunction device as a USB storage class device according to the USB standard when establishing a connection with the computer; and a controlling unit that, when output data including a command in a SCSI-compliant data format is transferred from the computer, determines which one of the plurality of functions the output data is for controlling, based on a value stored in a logic unit number (LUN) field provided in the command.

According to another aspect, the present invention provides a device control system including: a computer; and a multifunction device having a plurality of functions, the plurality of functions including at least a data storage function and a function different from the data storage function, the computer and the multifunction device being connected with each other via a universal serial bus (USB) interface. The multifunction device includes: a device data outputting unit that outputs information forcing an OS (operating system) in the computer to recognize the multifunction device as a USB storage class device according to the USB standard when establishing a connection with the computer; and a device controlling unit that, when output data including a command in a SCSI-compliant data format is transferred from the computer, determines which one of the plurality of functions the output data is for controlling, based on a value stored in a logic unit number (LUN) field provided in the command. The computer includes a computer controlling unit that, upon instructed by a data processor functioning on the computer to control one of the plurality of functions of the multifunction device, stores a value corresponding to the function that is the target of control in a LUN field provided in a command and transfers output data including the command to the multifunction device.

BRIEF DESCRIPTION OF THE DRAWINGS

In the drawings:

FIG. 7 is a flowchart illustrating steps in a process executed on the PC while the power to the PC is on;

DETAILED DESCRIPTION

Figure 1:
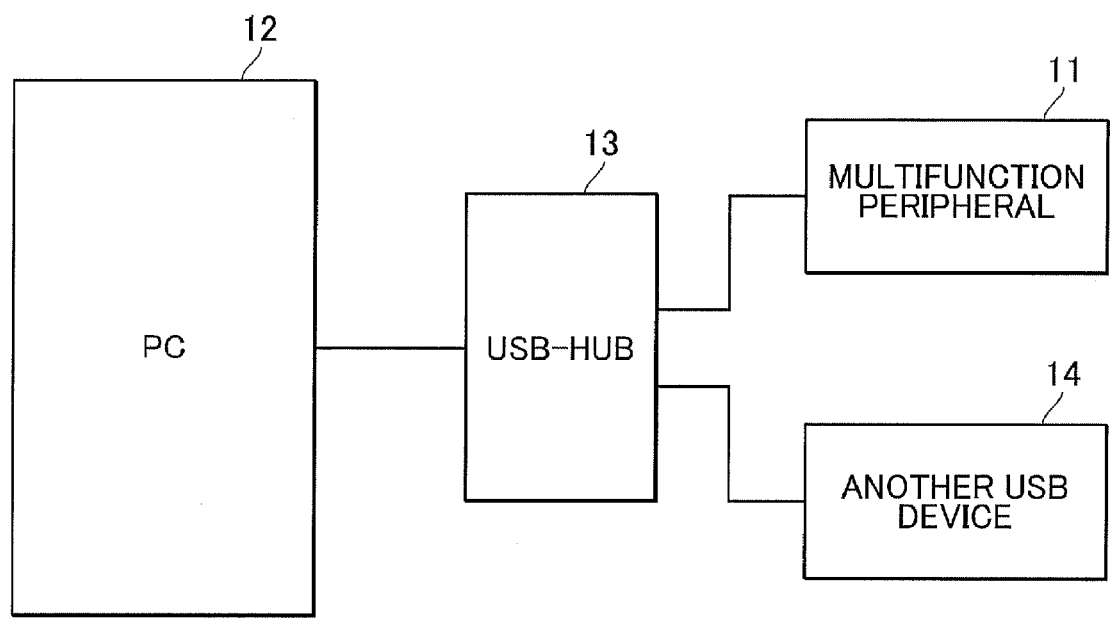
FIG. 1 is a block diagram showing an overall device control system according to an embodiment of the present invention.

A multifunction peripheral and a device control system according to an embodiment of the invention will be described while referring to the accompanying drawings wherein like parts and components are designated by the same reference numerals to avoid duplicating description.

Structure of a Device Control System

FIG. 1 is a block diagram showing the overall structure of a device control system according to an embodiment of the present invention.

The device control system includes a multifunction peripheral 11 and a personal computer (PC) 12. Both the multifunction peripheral 11 and PC 12 have a USB interface and are connected to each other via a USB hub 13 so that data can be exchanged between the two. Another USB device 14, for example, is also connected to the USB hub 13.

In the embodiment, the multifunction peripheral 11 is a device possessing multiple functions, including a printer function, scanner function, PC-FAX function, and card reader function (data storage function). These functions can be controlled from the PC 12.

According to the embodiment, as will be described later, the multifunction peripheral 11 forces the OS of the PC 12 to recognize the multifunction peripheral 11 as a USB storage class device according to the USB standard.

So, a USB storage driver is prepared in the PC 12 for the multifunction peripheral 11. As a result, the PC 12 and the multifunction peripheral 11 become able to transfer data therebetween according to the USB-compliant communication protocol.

It is noted that the USB standard prescribes that, when a computer and a USB storage class device are brought into the above-described condition, the computer and the USB storage class device perform data communications therebetween according to a SCSI-compliant method.

The SCSI-compliant device can have a plurality of logic units according to the SCSI standard. The Computer issues a command that is in a SCSI-compliant data format (hereinafter called SCSI command) and that is for controlling the function of each logic unit.

It is noted that several methods are specified in the SCSI standard for specifying a targeted logic unit, to which a command is to be issued. The SCSI-1 standard specifies that a single logic unit is specified by using a LUN field included in the SCSI command.

So, according to the present embodiment, the multifunction peripheral 11 is configured to function as a SCSI-compliant device according to the USB standard, and to function as a device having a plurality of logic units according to the SCSI standard. The PC 12 is configured to transfer SCSI commands to the logic units in a SCSI-1-compliant method.

In this way, the multifunction peripheral 11 functions as a device having a plurality of logic units. When output data including a SCSI command specifying a target logic unit in its LUN field is transferred from the PC 12 to the targeted logic unit, a function corresponding to the targeted logic unit is activated.

Thus, the multifunction device 11 serves as an SCSI-1-compliant device for the PC 12.

It is noted that the SCSI prescribes that devices of SCSI-2 and subsequent versions ignore the value in the LUN field of a SCSI command. Because the multifunction peripheral 11 of this embodiment is configured not to ignore the value stored in the LUN field, the multifunction peripheral 11 dose not serve as a device compliant with SCSI-2 or subsequent SCSI versions under SCSI standard.

When performing data transfer, the OS of the PC 12 recognizes the multifunction peripheral 11 as a single USB storage device, but is completely unaware of whether the multifunction peripheral 11 has a single SCSI-compliant logic unit or a plurality of SCSI-compliant logic units.

So, data transfer to all the logic units are performed through the same logical communication path under the USB standard. So, the multifunction peripheral 11 need be provided with only one input end point and only one output end point.

It is noted that the following function is provided standard in the OS of the PC 12: That is, when the OS recognizes a multifunction peripheral as a USB storage class device specified in the USB standard, the OS controls the device under the assumption that the LUN specified in the SCSI standard is 0 and the device has a data storage function. So, the multifunction peripheral 11 of the present embodiment is configured to determine that data transferred from the PC 12 is for controlling a data storage function when the data indicates the LUN of 0. This configuration can control the data storage function of the multifunction peripheral 11 by using the function provided standard in the OS of the PC 12.

Details of the PC 12 and the multifunction peripheral 11 will be described below.

Internal Structure of the Multifunction Peripheral

Figure 2:
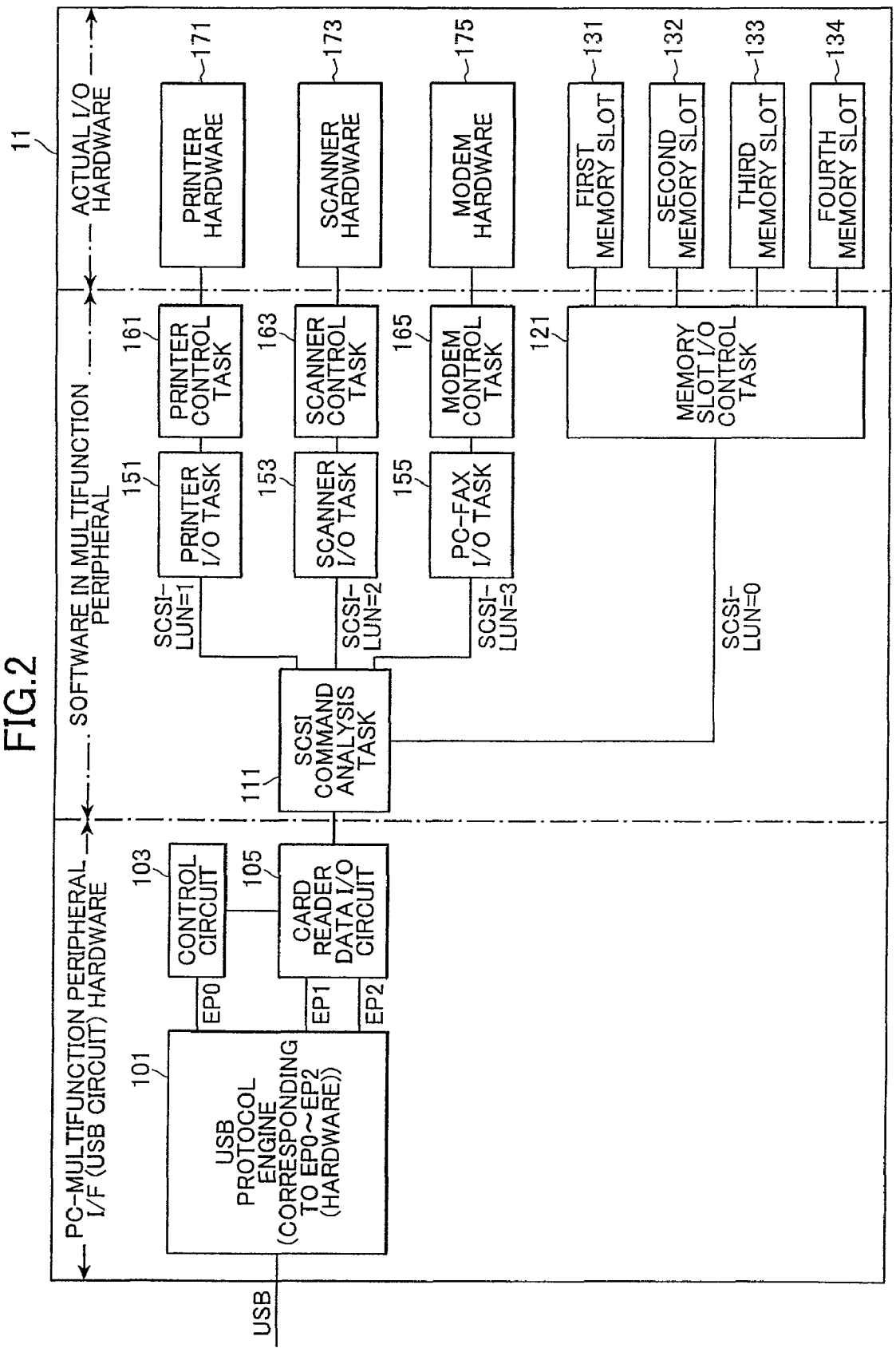
FIG. 2 is a block diagram showing the internal structure of a multifunction peripheral.

FIG. 2 is a block diagram showing the internal structure of the multifunction peripheral 11. The multifunction peripheral 11 is equipped with hardware constituting a USB interface, including a USB protocol engine 101, a control circuit 103, and a card reader data I/O circuit 105. The USB protocol engine 101 controls data transfers between the multifunction peripheral 11 and PC 12 according to the USB communication protocol.

This hardware is configured so that data is transferred between the PC 12 and the multifunction peripheral 11 via endpoints. More specifically, the control circuit 103 inputs and outputs various control data to and from the PC 12 (bi-directional communications) through a control transfer endpoint (hereinafter abbreviated as EP0).

On the other hand, the card reader data I/O circuit 105 transfers input data to the PC 12 through an input data endpoint (hereinafter abbreviated as EP1), and acquires output data transferred from the PC 12 via an output data endpoint (hereinafter abbreviated as EP2).

The multifunction peripheral 11 is also provided with a SCSI command analysis task 111 as one of its software functions. When data is transferred from the card reader data I/O circuit 105 to the SCSI command analysis task 111, the SCSI command analysis task 111 redirects the data to one of four data processing systems based on information included in the transferred data.

More specifically, the four data processing systems of the embodiment correspond to the card reader function, printer function, scanner function, and PC-FAX function.

Further, the data transferred to the SCSI command analysis task 111 includes a command that is issued by the PC 12, that is in a SCSI-compliant data format (hereinafter called SCSI command), and that has a region called an LUN field.

The SCSI command analysis task 111 determines whether output data received from the PC 12 is data for controlling one of the plurality of functions (card reader function, printer function, scanner function, and PC-FAX function) based on a value stored in the LUN field (hereinafter referred to as the SCSI-LUN).

For example, the SCSI command analysis task 111 determines that the output data is data for controlling the card reader function if the SCSI-LUN is 0, data for controlling the printer function if the SCSI-LUN is 1, data for controlling the scanner function if the SCSI-LUN is 2, and data for controlling the PC-FAX function if the SCSI-LUN is 3.

After making this determination, the SCSI command analysis task 111 redirects the data to the corresponding data processing system. Further, when one of the data processing systems transfers data to the SCSI command analysis task 111 as a result of a process, the SCSI command analysis task 111 relays this data to the card reader data I/O circuit 105.

When the SCSI command analysis task 111 redirects data to the data processing system on the SCSI-LUN=0 side (shown in FIG. 2), this data is transferred to the memory slot I/O control task 121. The memory slot I/O control task 121 is software functioning to control a first memory slot 131, a second memory slot 132, a third memory slot 133, and a fourth memory slot 134.

Each of the first through fourth memory slots 131-134 is a slot that accepts a memory card and each slot accepts a memory card of a different standard than the other slots.

In the embodiment, the first through fourth memory slots 131-134 are configured for exclusive use. For example, when a card is inserted into the first memory slot 131, other slots are unusable until that memory card is removed.

Further, when the SCSI command analysis task 111 redirects data to the data processing system on the SCSI-LUN=1 side, this data is transferred to the printer I/O task 151. Data transferred to the printer I/O task 151 is further relayed to the printer control task 161 for controlling the printer hardware 171.

When diverting data to the data processing system on the SCSI-LUN=2 side, the SCSI command analysis task 111 transfers the data to the scanner I/O task 153. Data transferred to the scanner I/O task 153 is further relayed to the scanner control task 163 for controlling the scanner hardware 173.

When diverting data to the data processing system on the SCSI-LUN=3 side, the SCSI command analysis task 111 transfers the data to the PC-FAX I/O task 155. Data transferred to the PC-FAX I/O task 155 is further relayed to the modem control task 165 for controlling the modem hardware 175.

Internal Structure of the PC

Figure 3:
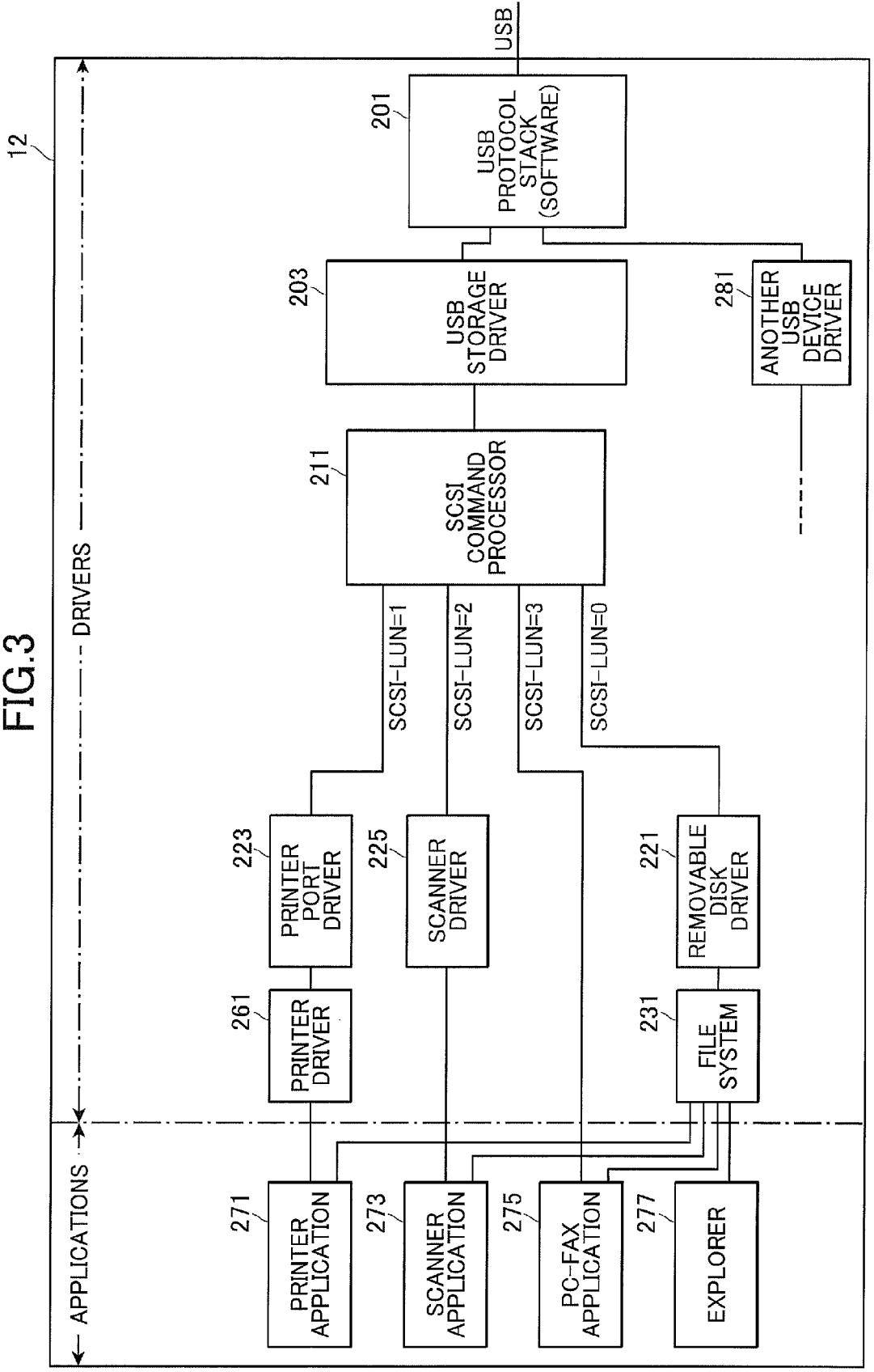
FIG. 3 is a block diagram showing the internal structure of a PC.

FIG. 3 is a block diagram showing the internal structure of the PC 12. The PC 12 has standard functions of the OS, such as a USB protocol stack 201, a USB storage driver 203, a SCSI command processor 211, a removable disk driver 221, and a file system 231.

The PC 12 also has special software corresponding to the multifunction peripheral 11 functioning as a printer port driver 223, a scanner driver 225, and a printer driver 261.

The PC 12 also includes application software that uses the above functions, such as a printer application 271, a scanner application 273, and a PC-FAX application 275.

The OS installed on the PC 12 is Windows (registered trademark) in the embodiment. Therefore, the PC 12 also includes Explorer 277 as software that comes bundled with Windows. However, an OS other than Windows may be installed on the PC 12, provided that the OS can implement the same functions.

The PC 12 also includes another USB device driver 281 corresponding to the USB device 14.

Figure 4:
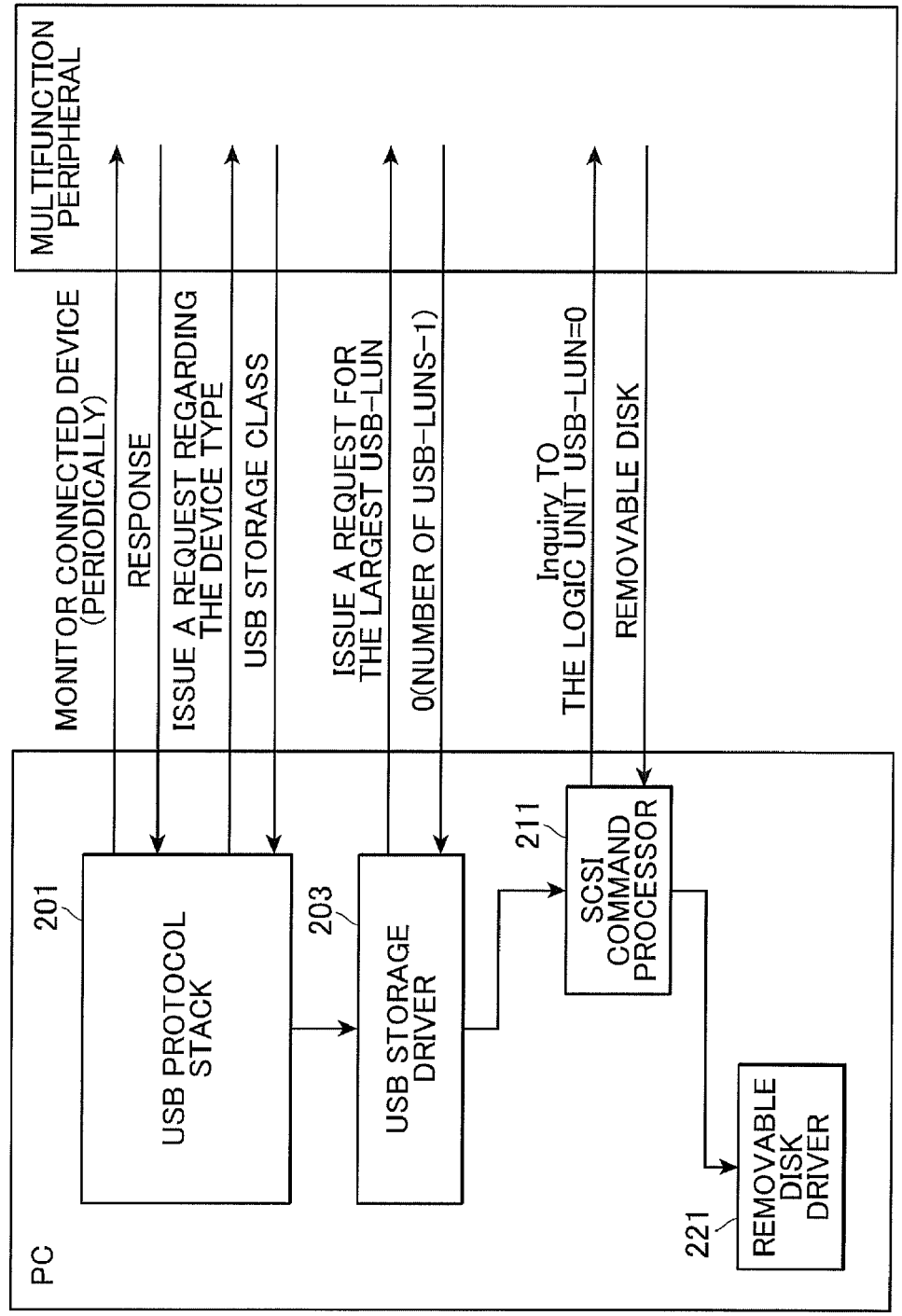
FIG. 4 is an explanatory diagram showing data exchanged when establishing a connection between the PC and multifunction peripheral.

With this construction, the USB protocol stack 201 begins functioning when the PC 12 is started and, thereafter, periodically monitors whether a USB device is connected to the PC 12, as illustrated in FIG. 4.

Since the multifunction peripheral 11 returns a response to the PC 12 when the multifunction peripheral 11 is connected to the PC 12, the USB protocol stack 201 issues a request to the multifunction peripheral 11 for a response regarding the device type. Upon receiving this request, the multifunction peripheral 11 returns a response indicating that the multifunction peripheral 11 is a USB storage class device. Accordingly, the PC 12 loads the USB storage driver 203 so that the USB storage driver 203 is running in the background.

When functioning, the USB storage driver 203 issues a request to the multifunction peripheral 11 for the largest LON. Here, "LUN" is a USB-compliant LUN and is different from the SCSI-LUN described above. Therefore, a USB-compliant LON will be called "USB-LUN" to differentiate this from the SCSI-LUN described above.

The multifunction peripheral 11 returns the largest USB-LUN (USB-LUN=0 in the example of the embodiment) in response to the request from the PC 12 described above. Accordingly, the PC 12 recognizes that there exists a single logic unit corresponding to USB-LUN=0 and creates a SCSI command processor 211 associated with this logic unit. The SCSI command processor 211 is a port for transferring SCSI commands to the SCSI command analysis task 111 via the USB storage driver 203.

When created, the SCSI command processor 211 issues a SCSI command "Inquiry" to the logic unit USB-LUN=0. Upon receiving this inquiry, the multifunction peripheral 11 returns a response indicating that the device type is a removable disk. Accordingly, the PC 12 loads the removable disk driver 221.

In this way, the logic unit corresponding to USB-LUN=0 is linked to the file system 231 and, consequently, a drive letter is assigned to the logic unit USB-LUN=0. Thereafter, the logic unit USB-LUN=0 can be accessed by specifying this drive letter.

Once the drivers are loaded according to the above procedure, a logical communication path is constructed between the PC 12 and the logic unit corresponding to USB-LUN=0, enabling the transfer of data via the communication path according to a SCSI-compliant method. While the OS of the PC 12 recognizes the logic unit corresponding to USB-LUN=0, the OS is completely unaware of the structure for the SCSI-compliant logic unit.

More specifically, when the PC 12 exchanges data with the logic unit corresponding to USB-LUN=0, the removable disk driver 221 provided standard in the OS is configured to issue a SCSI command by specifying SCSI-LUN=0 unconditionally.

This is because the OS of the PC 12 is configured to use SCSI commands when transferring data according to the USB standard, but is not configured to differentiate the plurality of logic units specified in the SCSI standard.

Further, the specifications of the USB standard is essentially formulated around SCSI-2. In SCSI-2, devices ignore the value in the LUN field of a SCSI command (SCSI-LON), and it is recommended that the LUN field be set to 0. Accordingly, the USB-compliant removable disk driver 221 is configured to set the LUN field to 0 when issuing a SCSI command.

Based on the above described specifications of the OS in the PC 12, the multifunction peripheral 11 redirects output data from the PC 12 under the assumption that the logic unit corresponding to SCSI-LUN=0 is under the control of the memory slot I/O control task 121.

This ensures that a SCSI command issued from the removable disk driver 221 provided as a standard function of the OS is transferred to the memory slot I/O control task 121. Hence, the multifunction peripheral 11 can function as a USB storage device as recognized by the OS of the PC 12.

As described above, while the OS of the PC 12 cannot differentiate between the plurality of logic units specified in the SCSI standard, the OS prepares a communication path on which SCSI commands can be issued to the multifunction peripheral 11.

By providing software, separate from the removable disk driver 221, for issuing SCSI commands to logic units other than SCSI-LUN=0, the OS can transfer the SCSI commands to the multifunction peripheral 11 along the prepared communication path.

In other words, the OS of the PC 12 constructs a logical USB-compliant communication path in order to perform control with the removable disk driver 221. Additionally, by using software capable of issuing SCSI commands, these SCSI commands can be transferred to the multifunction peripheral 11 along the communication path prepared by the OS.

When transferring data according to this method, each software issuing SCSI commands and a corresponding logic unit in the multifunction peripheral 11 exchanges data according to a SCSI-compliant method, without realizing whether the communication protocol is compliant with the USB standard.

On the other hand, while the OS of the PC 12 prepares the logic communication path for transferring data according to the SCSI standard by using the USB-compliant communication protocol, the OS is not aware of the type of data being transmitted over the logical communication path. Accordingly, any type of data can be transmitted over the communication path prepared by the OS, provided that the transmission method is SCSI compliant, even when the data corresponds to a device other than a data storage system.

Hence, in the embodiment, device drivers or applications use the characteristics of this communication path to issue SCSI commands for the printer function, scanner function, and PC-FAX function to logic units other than SCSI-LUN=0.

More specifically, when the SCSI command "Inquiry" is issued from the PC 12, the multifunction peripheral 11 returns a response indicating a SCSI-1-compliant device. This method allows the use of the LUN field in the SCSI command according to the SCSI standard.

Next, the printer port driver 223 is loaded as a static driver for the printer function. The printer port driver 223 issues SCSI commands while specifying SCSI-LUN=1 in the LUN field of the SCSI command. Consequently, the SCSI command can be issued to the logic unit corresponding to SCSI-LUN=1.

Similarly, the scanner driver 225 is loaded as a static driver for the scanner function and issues SCSI commands to the logic unit corresponding to SCSI-LUN=2.

Further, the PC-FAX application 275 is provided for the PC-FAX function and issues SCSI commands to the logic unit corresponding to SCSI-LUN=3.

By employing this construction, each of the printer port driver 223, scanner driver 225, and PC-FAX application 275 can control the printer function, scanner function, and PC-FAX function of the corresponding logic unit according to a SCSI-compliant method, without being conscious of the USB standard.

Since a communication path need only be prepared for exchanging data with a single logic unit according to the USB standard, only one each of the input endpoint EP1 and output endpoint EP2 need be provided in the multifunction peripheral 11. On this point, the multifunction peripheral 11 differs greatly from a USB compound device, even when both devices conform to the same USB standard.

That is, with a USB compound device, it is necessary to provide one each of an input data endpoint and an output data endpoint for each function, thereby making the total number of input and output endpoints equivalent to two times the number of functions. However, with the configuration of the multifunction peripheral 11 described above, the total number of input and output data endpoints is "2", regardless of the number of functions.

After each driver is prepared on the PC 12 according to the above procedure, by using a drive letter corresponding to the logic unit USB-LUN=0, SCSI commands can be issued to the logic unit corresponding to SCSI-LUN=0. Hence, the PC 12 can access a memory card mounted in any of the first through fourth memory slots 131-134 using the drive letter corresponding to the LUN0 logic unit.

For example, if the user performs an operation using the Explorer 277 on a file in a memory card mounted in the first memory slot 131, the Explorer 277 transfers a command to the multifunction peripheral 11 via the file system 231, removable disk driver 221, SCSI command processor 211, USB storage driver 203, and USB protocol stack 201.

The multifunction peripheral 11 then returns a response to the Explorer 277 via the USB protocol stack 201, USB storage driver 203, SCSI command processor 211, removable disk driver 221, and file system 231.

Print data outputted from the printer application 271 is transferred to the printer port driver 223 via the printer driver 261. The printer port driver 223 issues to the logic unit SCSI-LUT=1 a command for outputting print data to a SCSI-compliant printer device, whereby print data is transferred to the SCSI command processor 211 and in turn transferred to the multifunction peripheral 11 via the USB storage driver 203 and USB protocol stack 201.

Similarly, scanner control data and the like outputted from the scanner application 273 is transferred to the multifunction peripheral 11 via the scanner driver 225, SCSI command processor 211, USB storage driver 203, and USB protocol stack 201. Further, facsimile transmission data, control data, and the like outputted from the PC-FAX application 275 are transferred to the multifunction peripheral 11 via the SCSI command processor 211, USB storage driver 203, and USB protocol stack 201.

In some cases, the above data transfer results in input data being transferred from the multifunction peripheral 11 to the PC 12. For example, when scanner control data is transferred to the multifunction peripheral 11, the scanner function on the multifunction peripheral 11 is activated, resulting in scanner data being transferred from the multifunction peripheral 11 side.

When input data, such as scanner data, is transferred to the PC 12, the data is directed to the scanner application 273 via the USB protocol stack 201, USB storage driver 203, SCSI command processor 211 and the scanner driver 225.

Status data for the printer function, such as data related to a print error or the like, is transferred to the printer application 271 via the USB protocol stack 201, USB storage driver 203, SCSI command processor 211, printer port driver 223, and printer driver 261.

If the transferred data is facsimile reception data received with the PC-FAX function, the data is directed to the PC-FAX application 275 via the USB protocol stack 201, USB storage driver 203 and SCSI command processor 211.

Process for Installing Multifunction Peripheral Software

Next, a process for installing multifunction peripheral software on the PC 12 enabling the PC 12 to use the multifunction peripheral 11 having the above construction will be described with reference to the flowcharts in FIGS. 5 and 6.

Figure 5:
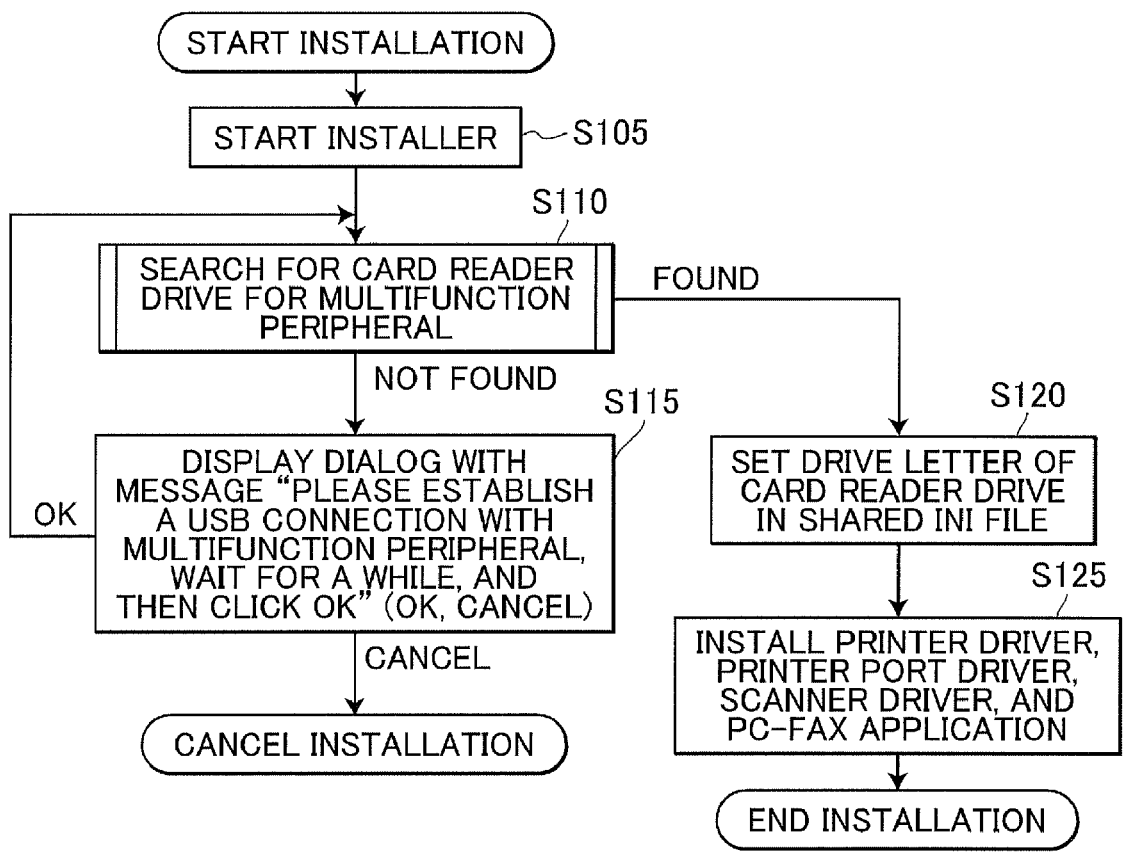
FIG. 5 is a flowchart illustrating steps in an installation process executed by the PC for installing multifunction peripheral software.

In S105 at the beginning of the process shown in FIG. 5, the PC 12 launches an installer. This process may be executed when the user performs a prescribed operation or may be executed automatically when a CD-ROM or other medium is inserted into a CD-ROM drive or the like.

After the installer is launched, in S110 the PC 12 searches for the card reader drive of the multifunction peripheral 11. This process is described in greater detail with reference to FIG. 6.

Figure 6:
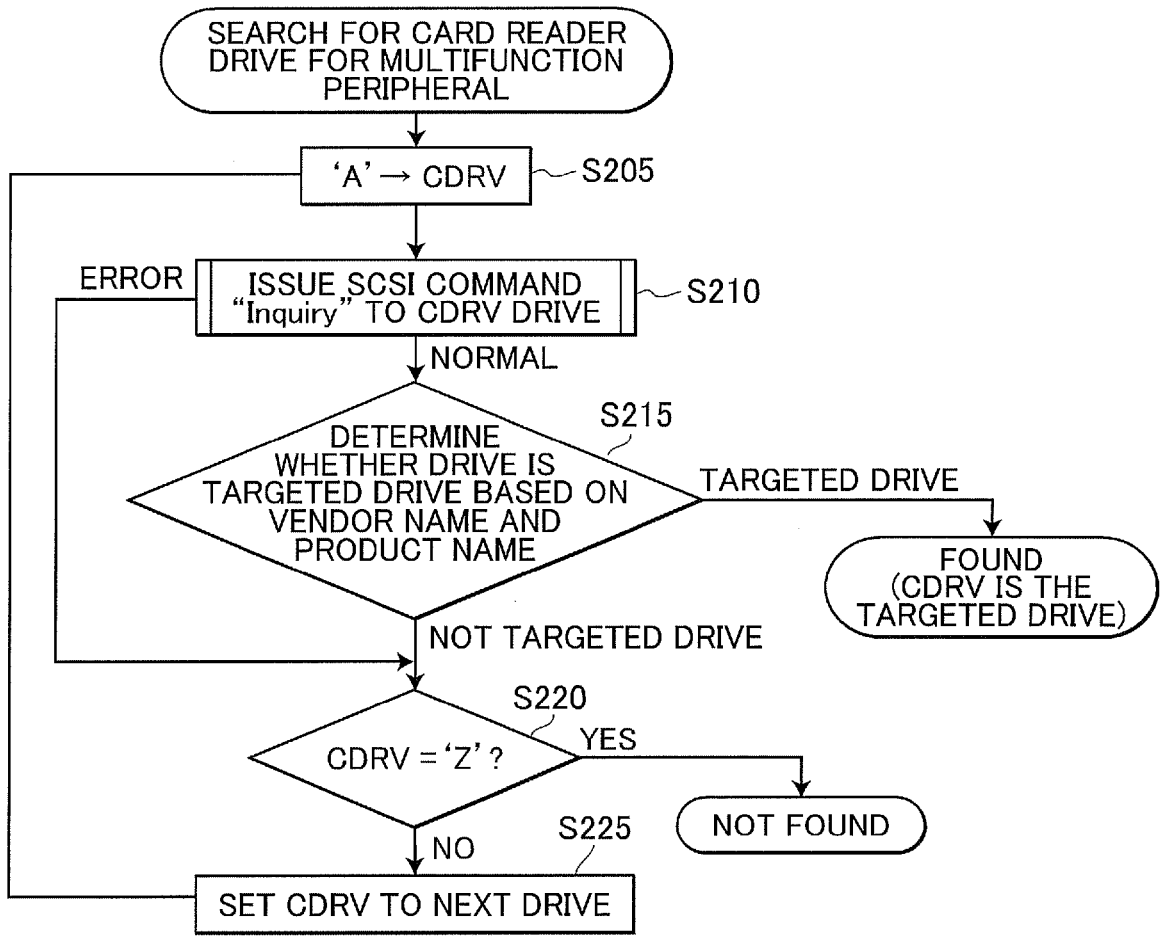
FIG. 6 is a flowchart illustrating steps in a process of searching for a multifunction peripheral card reader drive executed on the PC.

Specifically, in S205 of FIG. 6, the PC 12 sets a variable CDRV initially to drive letter "A" to begin searching drive letters "A" through "Z" in order. In S210 the PC 12 issues a SCSI command "Inquiry" to the drive CDRV (drive "A" immediately after performing S205, for example). This command is used to reference the device type and the like.

If a response to the command is returned normally in S210 (S210: normal), then in S215 the PC 12 determines whether drive CDRV is the drive corresponding to the multifunction peripheral 11 targeted by the program based on the vendor name and product name included in the response.

If drive CDRV is the targeted drive (S215: targeted drive), then the PC 12 ends the process in FIG. 6 since the drive corresponding to the multifunction peripheral 11 has been found.

However, if the drive CDRV does not correspond to the multifunction peripheral 11 (S215: not targeted drive) or if an error is returned in response to the command issued in S210 (S210: error), the PC 12 advances to S220. In S220 the PC 12 determines whether the drive letter set for the variable CDRV is "Z".

If the variable CDRV is not set to drive letter "Z" (S220: NO), then in S225 the PC 12 sets the variable CDRV to the drive letter of the next drive (for example, drive "B" if the current drive letter is "A"), and returns to S210.

In this way, the process in S210-S220 is repeated until the drive letter set for variable CDRV is "Z" or the targeted drive letter is found. If the PC 12 determines in S215 that the targeted drive has been found while repeating the process in S210-S220, the PC 12 ends the process in FIG. 6.

On the other hand, if the drive letter set for variable CDRV is "Z" (S220: YES), then the above process has been performed for all drive letters "A" through "Z". In this case, the drive corresponding to the targeted multifunction peripheral 11 could not be found, and the PC 12 ends the process of FIG. 6.

The process in S110 of FIG. 5 is completed after completing the process of FIG. 6 described above. If the card reader drive was not found in the process of S110 in FIG. 5 (S110: not found), then in S115 the PC 12 displays a dialog box for the user with the message "Please establish a USB connection with the multifunction peripheral, wait for a while, and then click OK."

After performing the process in S115, the PC 12 waits for input from the user. In this example, the user can select either "OK" or "Cancel" in the dialog box displayed on the display unit of the PC 12. For example, the user can use a pointing device to click on an "OK" button or a "Cancel" button displayed on the display unit.

If the user selects "Cancel" (S115: cancel), the PC 12 cancels the installation process. However, if the user selects "OK" (S115: OK), then the PC 12 repeats the process in S110.

However, if the card reader drive is found in S110 (S110: found), then in S120 the PC 12 sets the drive letter found for the card reader drive in a shared INI file. The shared INI file is a text file storing various settings related to drivers and application softwares dedicated for the multifunction peripheral 11. When one of the software programs for the multifunction peripheral 11 is executing, the program reads the contents of the shared INI file. In S120 the driver letter and model name of the multifunction peripheral determined in S110 are stored in the shared INI file.

In S125 the PC 12 installs a printer driver, printer port driver, scanner driver, and PC-FAX application, and subsequently ends the process for installing multifunction peripheral software.

An example process executed on the PC when the power is on

Next, an example process executed on the PC from the moment the PC is turned on until the moment the PC is turned off will be described with reference to FIGS. 7 through 9. The following description covers the case in which the power switch of the PC 12 is turned on, while the power switch of the multifunction peripheral 11 is already on.

Figure 7:
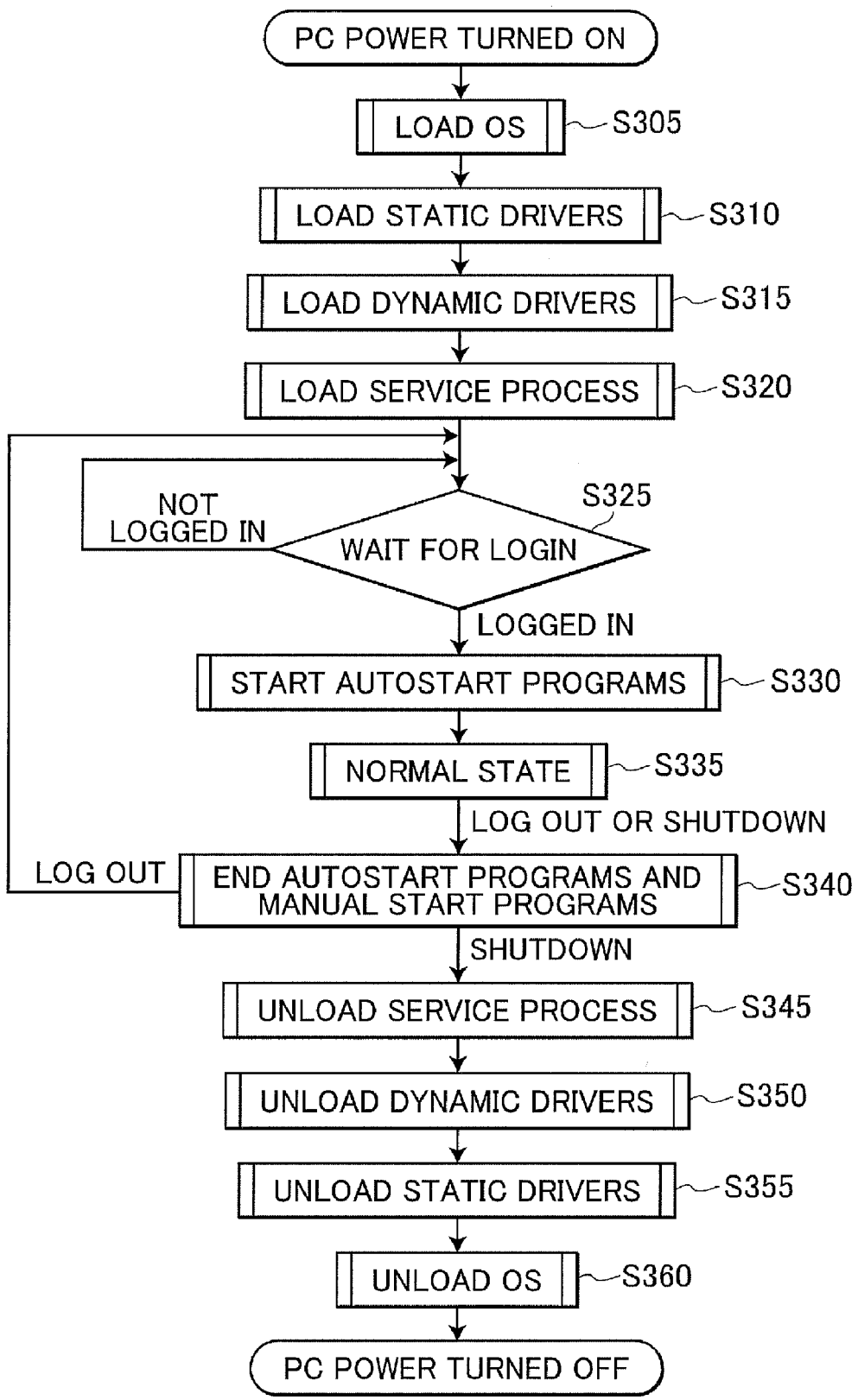

When the power switch of the PC 12 is turned on, first the PC 12 loads the OS in S305 of FIG. 7. In S310 the PC 12 loads static drivers. This process of S310 will be described in greater detail next with reference to FIG. 8.

Figure 8:
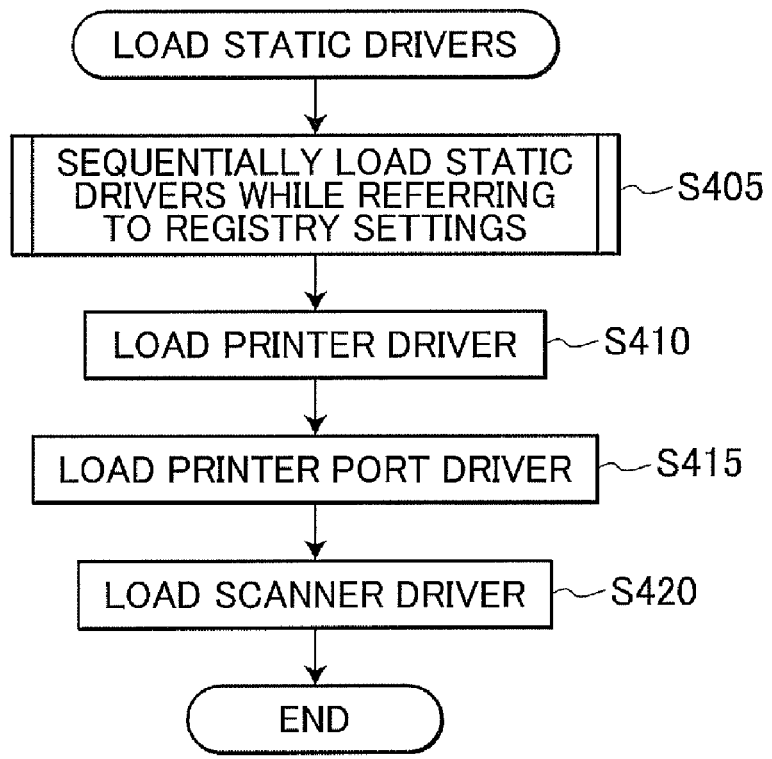
FIG. 8 is a flowchart illustrating steps in a process executed on the PC for loading static drivers.

As shown in FIG. 8, in S405 the OS of the PC 12 sequentially loads static drivers while referencing registry settings. Subsequently, the PC 12 loads a printer driver in S410, loads a printer port driver in S415, and loads a scanner driver in S420. After loading these drivers, the process in FIG. 8 ends.

The process in S310 of FIG. 7 is completed after completing the process shown in FIG. 8. Next, in S315 the PC 12 loads dynamic drivers. The process of S315 will be described next in detail with reference to FIG. 9.

Figure 9:
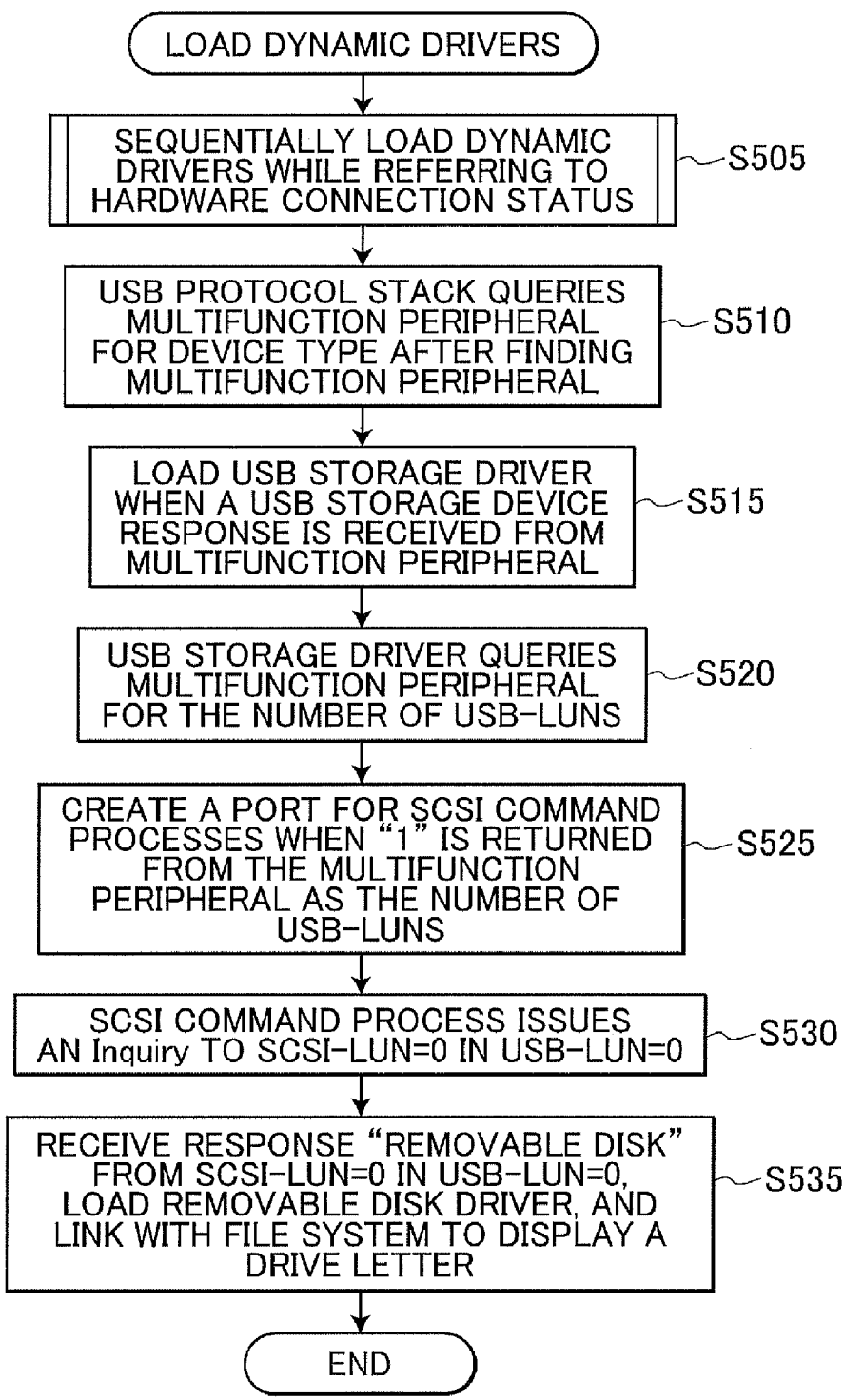
FIG. 9 is a flowchart illustrating steps in a process executed on the PC for loading dynamic drivers.

Specifically, in S505 of FIG. 9, the OS of the PC 12 sequentially loads dynamic drivers while referencing the status of hardware connections. In S510 the PC 12 queries the device type of the multifunction peripheral 11 after the USB protocol stack 201 has found the multifunction peripheral 11.

If there is a response to this query from the multifunction peripheral 11 indicating that the multifunction peripheral 11 is a USB storage device, in S515 the PC 12 loads the USB storage driver 203.

Since the USB storage driver 203 is put in a functioning state through the process of S515, in S520 the USB storage driver 203 queries the multifunction peripheral 11 for the number of USB-LUNs. More specifically, in S520 the USB storage driver 203 issues an inquiry for the largest LUN.

In the case of the embodiment, the multifunction peripheral 11 has a single USB-compliant logic unit and USB-LUN=0 is assigned to the logic unit, so the multifunction peripheral 11 returns "0" as the largest USB-LUN.

The PC 12 determines that the multifunction peripheral 11 has one USB-LUN based on the response of "0" for the largest USB-LUN. In this case, in S525 the PC 12 creates one port for the SCSI command process. Through the process of S525, the SCSI command processor 211 is configured.

After the SCSI command processor 211 is in a functioning state, in S530 the SCSI command processor 211 issues an "Inquiry" to the logic unit USB-LUN=0.

In response to this inquiry, in the case of the embodiment, in S535 the PC 12 receives the response "removable disk" from the logic unit USB-LUN=0. Here, the PC 12 loads the SCSI connection removable disk driver 221 provided standard in the OS and links the removable disk driver 221 to the file system 231, causing a drive letter to be assigned to the logic unit USB-LUN=0. The drive letter appears in Explorer 277.

The removable disk driver 221 in the embodiment is a SCSI connection driver provided standard in the OS of the PC 12 and is used for establishing a USB connection between the PC 12 and a USB storage device. Therefore, the manufacturer of the multifunction peripheral 11 need not provide the user with such a SCSI connection driver.

The process in S315 of FIG. 7 ends after completing the process for loading dynamic drivers described in FIG. 9. Next, in S320 the PC 12 loads a service process, and in S325 waits for login data.

Specifically, the PC 12 waits in S325 until the user has completed a login operation (S325: not logged in). After the user has completed the login process (S325: logged in), in S330 the PC 12 launches autostart programs. The OS of the PC 12 sequentially launches autostart programs while referencing programs listed in the Start Up in the Start Menu.

After completing S330 in FIG. 7 by launching the autostart programs in the process, in S335 the PC 12 enters a normal state. Once the PC 12 has arrived at this normal state, the user can use the printer application 271, scanner application 273, PC-FAX application 275, Explorer 277, and the like as desired.

If the user subsequently performs an operation to log out or to shutdown the PC 12 (S335: log out or shutdown), in S340 the PC 12 first stops all the programs started automatically and manually and, in the case of a logout operation (S340: logout), returns to S325.

However, in the case of a shutdown operation (S340: shutdown), in S345 the PC 12 unloads the service process, in S350 unloads the dynamic drivers, and in S355 unloads the static drivers. Lastly, in S360 the PC 12 unloads the OS and shuts off the power to the PC 12. The process in S345-S360 unloads all software in the reverse order of the process in S305-S320.

Process executed with the SCSI command analysis task.

Figure 10:
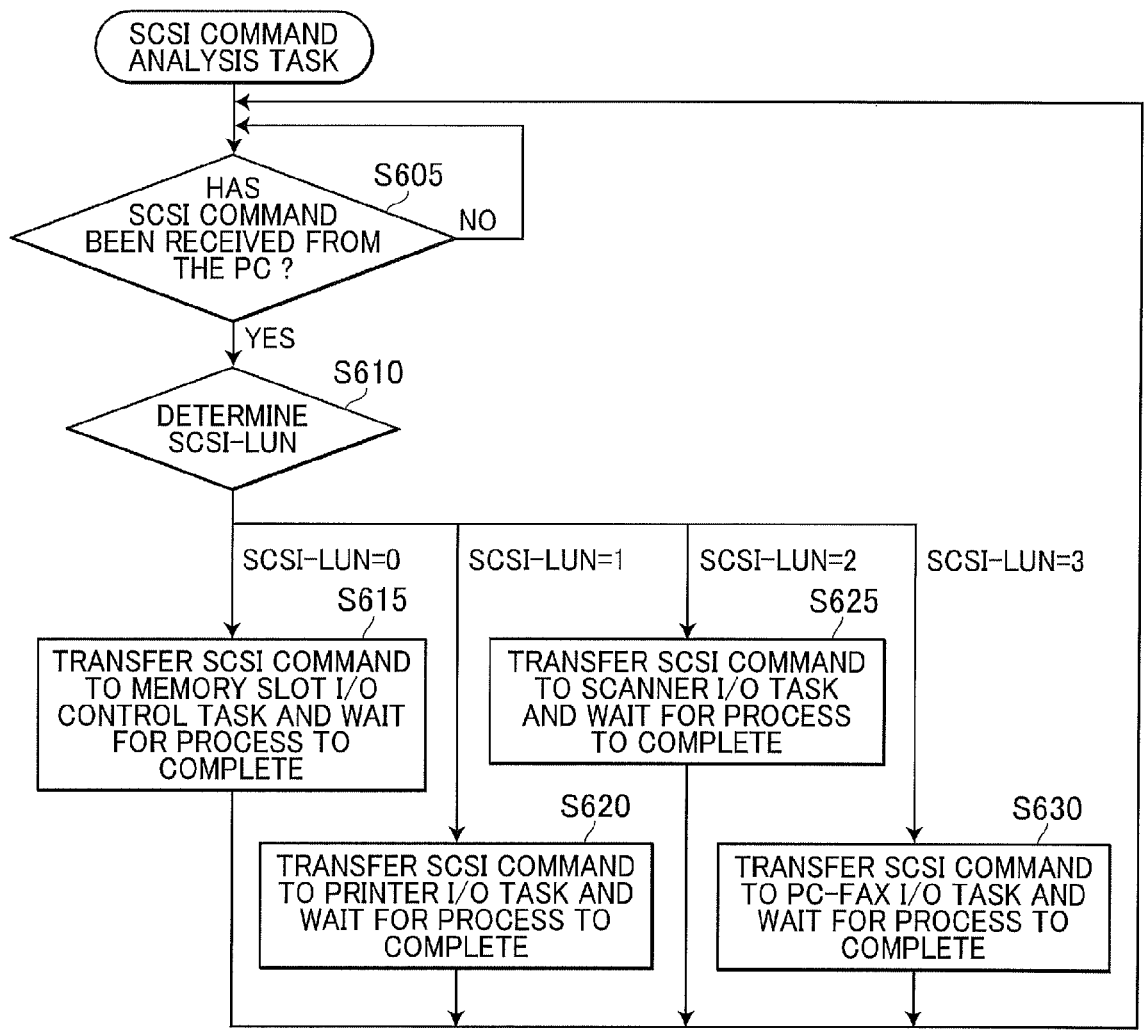
FIG. 10 is a flowchart illustrating steps in a process executed with a SCSI command analysis task implemented on the multifunction peripheral.

Next, the process executed by the SCSI command analysis task 111 provided in the multifunction peripheral 11 will be described with reference to FIG. 10.

In S605 at the beginning of this process, the SCSI command analysis task 111 determines whether a SCSI command is transferred from the PC 12. The SCSI command analysis task 111 repeatedly loops back to S605 while a SCSI command has not been received from the PC 12 (S605: NO).

When a SCSI command is transferred from the PC 12 (S605: YES), in S610 the SCSI command analysis task 111 determines which one of "0" through "3" a value stored in the LUN field (SCSI-LUN) is.

If the SCSI-LUN is "0" (S610: SCSI-LUN=0) in S610, the SCSI command analysis task 111 redirects the SCSI command to the memory slot I/O control task 121, and in S615 waits for the process performed with the memory slot I/O control task 121 to end.

In the process of S615, the SCSI command analysis task 111 transfers the SCSI command to the memory slot I/O control task 121. After transferring the SCSI command to the memory slot I/O control task 121, the SCSI command analysis task 111 waits for the process performed with the memory slot I/O control task 121 to end.

After the process with the memory slot I/O control task 121 ends, the SCSI command analysis task 111 receives a response from the memory slot I/O control task 121, returns the response as a response to the SCSI command to the PC 12, and ends the process in S615. After completing the process in S615, the SCSI command analysis task 111 returns to S605.

Here, a specific example will be given for the process in S615. In this example, the PC 12 transfers a SCSI command to the multifunction peripheral 11 requesting to write data to media (a memory card in the embodiment). In S615 the SCSI command analysis task 111 transfers the received SCSI command to the memory slot I/O control task 121.

At this time, the memory slot I/O control task 121 executes a process to write the target data to the media and subsequently returns data indicating the results of the writing operation to the SCSI command analysis task 111 as a response.

During the process of S615, the SCSI command analysis task 111 waits until the memory slot I/O control task 121 completes the operation. After receiving a response from the memory slot I/O control task 121, the SCSI command analysis task 111 returns this response to the PC 12 as a response to the SCSI command, and subsequently ends the process in S615.

As another example, the PC 12 may transfer a SCSI command to the multifunction peripheral 11 requesting to read data from media. In this case, in S615 the SCSI command analysis task 111 transfers the received SCSI command to the memory slot I/O control task 121.

At this time, the memory slot I/O control task 121 executes a process to read the target data from the media and subsequently returns data indicating the results of the reading operation, as well as the read data, to the SCSI command analysis task 111 as a response.

During the process of S615, the SCSI command analysis task 111 waits until the memory slot I/O control task 121 completes the operation. After receiving a response from the memory slot I/O control task 121, the SCSI command analysis task 111 returns this response to the PC 12 as a response to the SCSI command, and subsequently ends the process in S615.

If any of the other various SCSI commands are received by the multifunction peripheral 11, in S615 the SCSI command analysis task 111 transfers the command to the memory slot I/O control task 121 and subsequently transfers the response returned from the memory slot I/O control task 121 to the PC 12.

Since there are a variety of SCSI commands that can be transferred from the PC 12 to the memory slot I/O control task 121, as described above, the details of the processes executed with the memory slot I/O control task 121 also vary widely according to the SCSI command. However, since the processes executed with the memory slot I/O control task 121 are identical to processes well known in the art executed on a conventional device having a data storage function, a description of these processes will not be included herein.

On the other hand, if the multifunction peripheral 11 determines in S610 that the SCSI-LUN is "1" (S610:SCSI- LUN=1), then in S620 the multifunction peripheral 11 transfers the SCSI command to the printer I/O task 151 and waits for the process performed with the printer I/O task 151 to end.

Specifically, in S620 the multifunction peripheral 11 transfers the SCSI command received from the PC 12 from the SCSI command analysis task 111 to the printer I/O task 151. After transferring the SCSI command to the printer I/O task 151, the SCSI command analysis task 111 waits for the process performed with the printer I/O task 151 to end.

After the process with the printer I/O task 151 ends, the SCSI command analysis task 111 receives a response from the printer I/O task 151, returns the response to the PC 12 as a response to the SCSI command, and ends the process in S620. After completing the process in S620, the SCSI command analysis task 111 returns to S605.

Here, a specific example will be given for the process in S620. In this example, the PC 12 transfers a SCSI command to the multifunction peripheral 11 requesting to output print data. In S620 the SCSI command analysis task 111 transfers the received SCSI command to the printer I/O task 151.

At this time, the printer I/O task 151 transfers data and the like to the printer control task 161, and the printer control task 161 controls the operation of the printer hardware 171 to perform a printing operation on a recording medium, for example. When the printer I/O task 151 becomes ready to receive the next print data, a response indicating this state is returned from the printer I/O task 151 to the SCSI command analysis task 111.

During the process of S620, the SCSI command analysis task 111 waits until the printer I/O task 151 completes the operation. After receiving a response from the printer I/O task 151, the SCSI command analysis task 111 returns this response to the PC 12 as a response to the SCSI command, and subsequently ends the process in S620.

There are a variety of SCSI commands that the PC 12 may transfer to the printer I/O task 151, including a command to acquire the printer status, for example. Details of processes executed by the printer I/O task 151 and printer control task 161 depend on the SCSI command. However, since the processes executed by the printer I/O task 151 and printer control task 161 are well known processes for conventional devices having a printer function, these processes will not be described herein.

Further, if the multifunction peripheral 11 determines in S610 that the SCSI-LUN is "2" (S610: SCSI-LUN=2), in S625 the multifunction peripheral 11 transfers the SCSI command to the scanner I/O task 153 and waits for the process with the scanner I/O task 153 to end.

Specifically, in S625 the SCSI command analysis task 111 transfers the SCSI command received from the PC 12 to the scanner I/O task 153. After transferring the SCSI command to the scanner I/O task 153, the SCSI command analysis task 111 waits for the process performed with the scanner I/O task 153 to end.

After the process with the scanner I/O task 153 ends, the SCSI command analysis task 111 receives a response from the scanner I/O task 153, returns this response to the PC 12 as a response to the SCSI command, and ends the process in S625. After completing the process in S625, the SCSI command analysis task 111 returns to S605.

Here, a specific example will be given for the process in S625. In this example, the PC 12 transfers a SCSI command to the multifunction peripheral 11 requesting scanner input. In S625 the SCSI command analysis task 111 transfers the received SCSI command to the scanner I/O task 153.

At this time, the scanner I/O task 153 transfers data and the like to the scanner control task 163, and the scanner control task 163 controls operations of the scanner hardware 173 for inputting image data from an original document. Subsequently, the scanner I/O task 153 returns this image data and the like to the SCSI command analysis task 111.

During the process of S625, the SCSI command analysis task 111 waits until the scanner I/O task 153 completes the process. After receiving a response from the scanner I/O task 153, the SCSI command analysis task 111 returns this response to the PC 12 as a response to the SCSI command, and subsequently ends the process in S625.

There are a wide variety of SCSI commands that the PC 12 can transfer to the scanner I/O task 153, including a command for acquiring the scanner status, for example. Accordingly, details of these processes executed by the scanner I/O task 153 and scanner control task 163 vary according to the SCSI command. However, since the processes executed with the scanner I/O task 153 and scanner control task 163 are identical to the processes well known in the art for conventional devices having a scanner function, a description of these processes will not be given herein.

Further, if the multifunction peripheral 11 determines in S610 that the SCSI-LUN is "3" (S610: SCSI-LUN=3), then in S630 the multifunction peripheral 11 transfers the SCSI command to the PC-FAX I/O task 155 and waits for the process with the PC-FAX I/O task 155 to end.

Specifically, in S630 the SCSI command analysis task 111 transfers the SCSI command received from the PC 12 to the PC-FAX I/O task 155. After transferring the SCSI command to the PC-FAX I/O task 155, the SCSI command analysis task 111 waits for the process performed with the PC-FAX I/O task 155 to end.

After the process with the PC-FAX I/O task 155 ends, the SCSI command analysis task 111 receives a response from the PC-FAX I/O task 155, returns this response to the PC 12 as a response to the SCSI command, and ends the process in S630. After completing the process in S630, the SCSI command analysis task 111 returns to S605.

Here, a specific example will be given for the process in S630. In this example, the PC 12 transfers a SCSI command to the multifunction peripheral 11 requesting to transmit facsimile data. In S630 the SCSI command analysis task 111 transfers the received SCSI command to the PC-FAX I/O task 155.

At this time, the PC-FAX I/O task 155 transfers data and the like to the modem control task 165, and the modem control task 165 controls operations of the modem hardware 175 to execute a fax transmission process and the like. When the PC-FAX I/O task 155 becomes ready to receive subsequent fax transmission data, a response indicating this status is returned to the SCSI command analysis task 111.

During the process of S630, the SCSI command analysis task 111 waits until the PC-FAX I/O task 155 completes the process. After receiving a response from the PC-FAX I/O task 155, the SCSI command analysis task 111 returns this response to the PC 12 as a response to the SCSI command, and subsequently ends the process in S630.

As another example, the PC 12 may transfer a SCSI command to the multifunction peripheral 11 requesting to receive facsimile data. In this case, in S630 the SCSI command analysis task 111 transfers the received SCSI command to the PC-FAX I/O task 155.

At this time, the PC-FAX I/O task 155 returns fax reception data and the like to the SCSI command analysis task 111 if such data is received. If fax reception data is not received, the PC-FAX I/O task 155 returns data to the SCSI command analysis task 111 indicating that no fax reception data was received.

During the process of S630, the SCSI command analysis task 111 waits until the PC-FAX I/O task 155 completes the process. After receiving a response from the PC-FAX I/O task 155, the SCSI command analysis task 111 returns this response to the PC 12 as a response to the SCSI command, and subsequently ends the process in S630.

There are a wide variety of SCSI commands that the PC 12 can transfer to the PC-FAX I/O task 155, including a command for acquiring the modem status, for example. Accordingly, details of these processes executed with the PC-FAX I/O task 155 and modem control task 165 vary according to the SCSI command. However, since the processes executed with the PC-FAX I/O task 155 and modem control task 165 are identical to the processes well known in the art for conventional devices having a PC-FAX function, a description of these processes will not be given herein.

Sample PC process performed when a SCSI command is issued.

Figure 11:
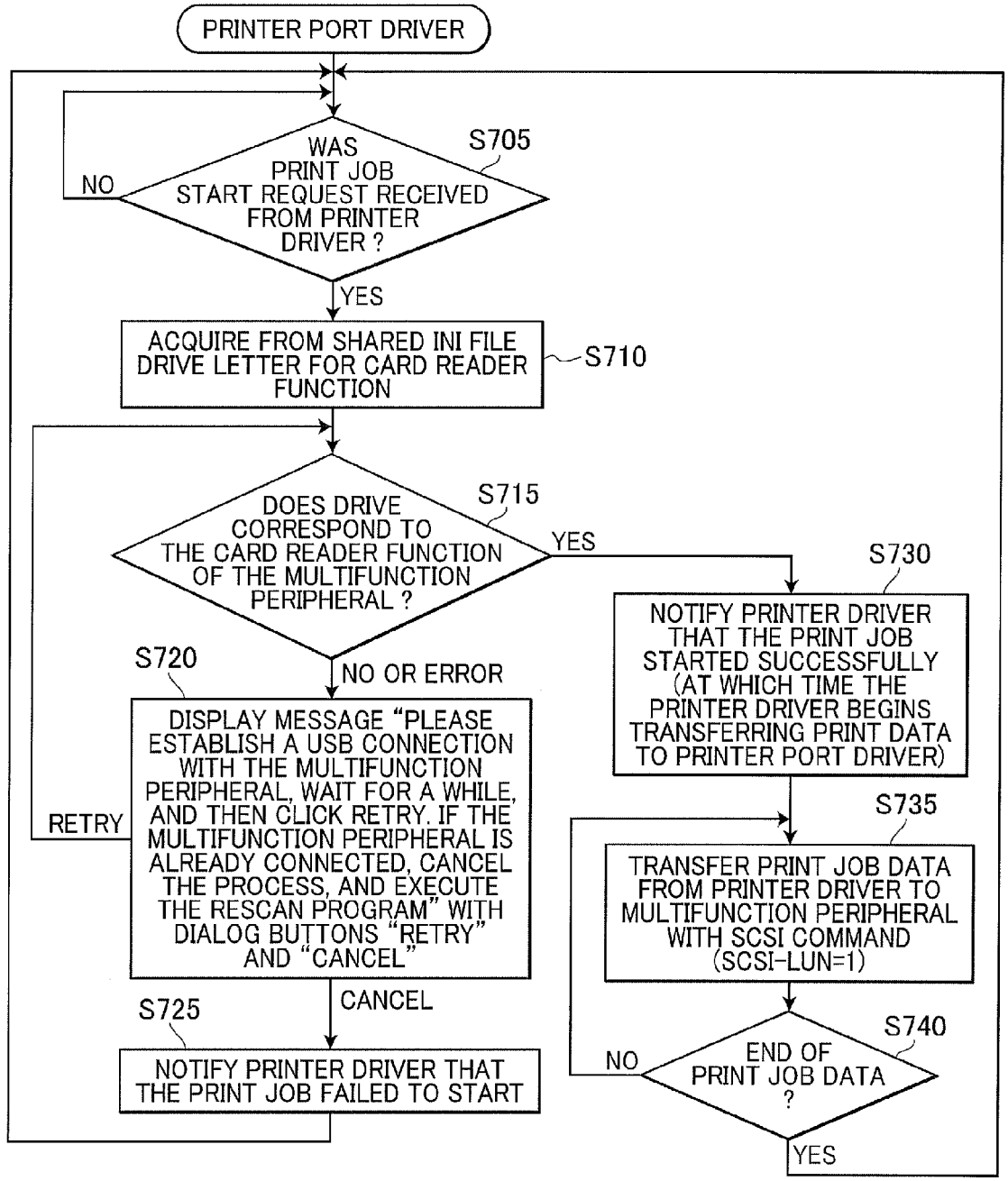
FIG. 11 is a flowchart illustrating steps in a process executed by the printer port driver of the PC.

Next, a detailed example will be given for one of various processes executed by the PC 12 when the PC 12 issues a SCSI command to the multifunction peripheral 11. FIG. 11 is a flowchart illustrating steps in a process executed by the printer port driver 223 of the PC 12. This process is executed when the printer port driver 223 is started.

In S705 at the beginning of this process, the PC 12 determines whether a print job start request has been received from the printer driver 261. If a print job start request has not been received (S705: NO), then the PC 12 continually loops back to S705 until a print job start request has been received from the printer driver 261.

When a print job start request has been received in S705 (S705: YES), in S710 the PC 12 acquires from the shared INI file the drive letter for the card reader function of the multifunction peripheral 11. It is noted that the drive letter acquired in S710 is the one that has been stored in the shared INI file in S120 described above, for example.

In S715 the PC 12 determines whether the drive assigned the drive letter read from the shared INI file actually corresponds to the card reader function of the multifunction peripheral 11.

The process in S715 is performed because it is possible that the assignment of the drive letter was modified after the shared INI file was created and that the drive letter stored in the shared INI file differs from the actual drive letter.

If the drive corresponding to the drive letter stored in the shared INI file is not the drive corresponding to the card reader function of the multifunction peripheral 11 or if an error occurred during the determination process (S715: NO or error), the PC 12 advances to S720. In S720 the PC 12 displays a message in a dialog box, such as "Please establish a USB connection with the multifunction peripheral and click "Retry" after a short pause. If the multifunction peripheral is already connected, cancel this operation and execute the rescan program."

After displaying the message in S720, the PC 12 waits for input from the user. During this time, the user can perform an operation in the dialog box displayed on the display unit of the PC 12 to click on one of the dialog buttons "Retry" or "Cancel."

If the user selects "Cancel" (S720: Cancel), the printer port driver 223 cannot continue this print-related process in the current state. Therefore, in S725 the printer driver 261 notifies the user that the print job failed to start and returns to S705.

However, the user can also click on "Retry" in S720 and, when necessary, can execute a rescan program prior to clicking on "Retry."

The rescan program will be described in detail later. By executing the rescan program, it is possible to eliminate an incompatibility between the drive letter recorded in the shared INI file and the actual drive letter.

If a USB connection was simply not established between the PC 12 and multifunction peripheral 11 (for example, when the power switch to the multifunction peripheral 11 was not turned on or when a USB cable was unplugged), the user can click "Retry" after establishing the USB connection. If the drive corresponding to the card reader function of the multifunction peripheral 11 cannot be recognized even after the user checks the USB connection and clicks "Retry," then the user may try clicking "Retry" after first executing the rescan program.

When the PC 12 confirms that the drive corresponds to the card reader function of the multifunction peripheral 11 while performing the above process (S715: YES), in S730 the PC 12 notifies the printer driver 261 that the print job started successfully. Upon receiving this notification, the printer driver 261 begins outputting print data to the printer port driver 223.

In S735 the printer port driver 223 relays print job data received from the printer driver 261 to the multifunction peripheral 11 with a SCSI command (SCSI-LUN=1).

Hence, the printer port driver 223 issues the SCSI command while specifying the SCSI-LUN assigned the printer function (SCSI-LUN=1 in the example of the embodiment) in order to issue the SCSI command to the logic unit in the multifunction peripheral 11 having the printer function.

SCSI commands issued from the printer port driver 223 in this way are subsequently transferred from the SCSI command processor 211 to the multifunction peripheral 11 via the USB storage driver 203 and USB protocol stack 201.

When received on the multifunction peripheral 11 side, the SCSI command is transferred to the SCSI command analysis task 111 described above. The SCSI command analysis task 111 transfers data to the data processing system corresponding to SCSI-LUN=1 based on the SCSI-LUN contained in the SCSI command, thereby implementing the printer function of the multifunction peripheral 11.

After completing the process in S735 described above, in S740 the PC 12 determines whether the end of the print job data has been reached. If the end of the print job data has not been reached (S740: NO), the PC 12 returns to S735, thereby repeatedly issuing SCSI commands while print job data remains.

When the PC 12 determines that the end of the print job data has been reached (S740: YES), the PC 12 returns to S705.

As described above, the printer port driver 223 controls the printer function of the multifunction peripheral 11 by issuing a SCSI command specifying SCSI-LUN=1 assigned to the printer function. Further, the logical communication path used for transferring the SCSI command from the PC 12 to the multifunction peripheral 11 is the same path that the OS of the PC 12 has prepared for using the card reader function of the multifunction peripheral 11.

The above description is an example process in which the printer port driver 223 issues a SCSI command while specifying SCSI-LUN=1. However, the PC 12 issues SCSI commands specifying other SCSI-LUNs when controlling other functions.

For example, the scanner driver 225 issues a SCSI command specifying SCSI-LUN=2 assigned to the scanner function of the multifunction peripheral 11. Further, the PC-FAX application 275 issues a SCSI command specifying SCSI-LUN=3 assigned to the PC-FAX function of the multifunction peripheral 11.

Since the SCSI command analysis task 111 of the multifunction peripheral 11 transfers data to the data processing system corresponding to the SCSI-LUN included in the SCSI command, the function intended by the PC 12 issuing the SCSI command is controlled.

Specifically, since the scanner driver 225 issues a SCSI command specifying SCSI-LUN=2, the scanner driver 225 can control the scanner function of the multifunction peripheral 11. Further, by issuing a SCSI command specifying SCSI-LUN=3, the PC-FAX application 275 can control the PC-FAX function of the multifunction peripheral 11.

Moreover, by issuing SCSI commands according to the above method, the logical communication path used for transferring the SCSI command from the PC 12 to the multifunction peripheral 11 can be a shared path that the OS of the PC 12 has prepared for using the card reader function of the multifunction peripheral 11. Hence, the card reader function, printer function, scanner function, and PC-FAX function can all share a single communication path for transferring SCSI commands.

Rescan Program

Figure 12:
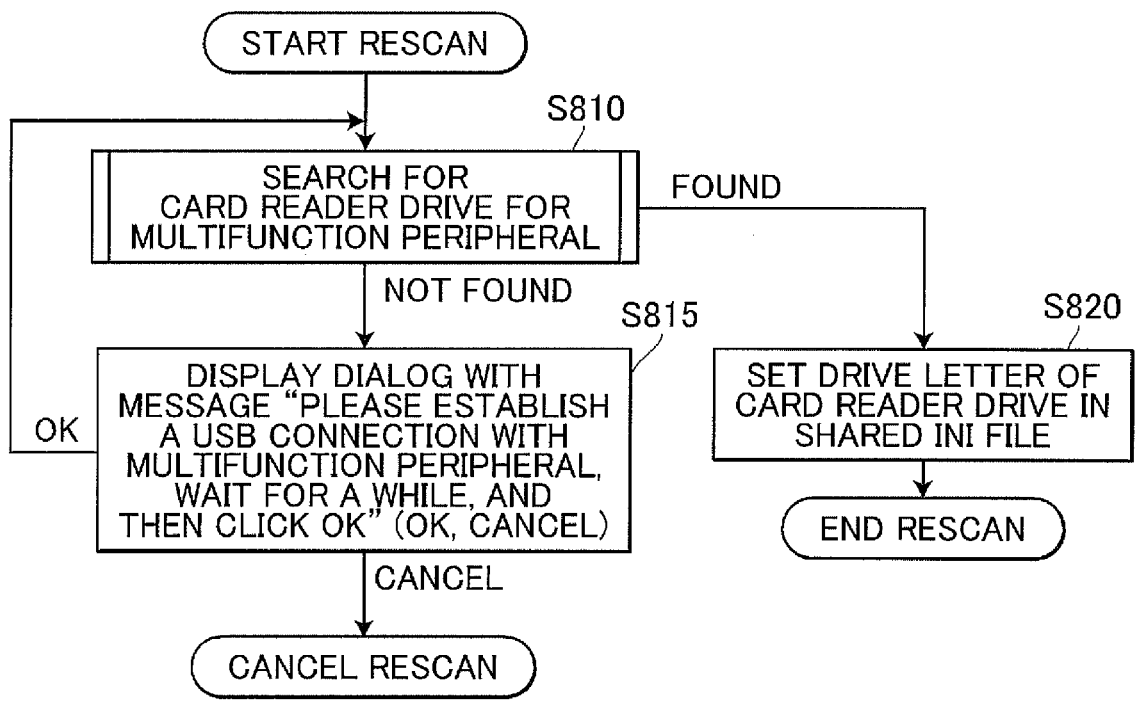
FIG. 12 is a flowchart illustrating steps in a rescan process executed by the PC for installing multifunction peripheral software.

Next, the rescan program alluded to in the process of S720 above will be described with reference to FIG. 12. As described above, the rescan program is a utility program provided for eliminating incompatibilities between the drive letter recorded in the shared INI file and the actual drive letter of a drive corresponding to the card reader function in the multifunction peripheral 11.

When executing the rescan program, in S810 the PC 12 searches for the card reader drive of the multifunction peripheral. Since the process in S810 is identical to the process described above in FIG. 6, a description of this process will not be repeated.

If the card reader drive could not be found in S810 (S810: not found), then in S815 the PC 12 displays a dialog box for the user with the message "Please establish a USB connection with the multifunction peripheral 11, wait for a while and then click OK."

In the process of S815, the PC 12 waits for input from the user. At this time, the user can perform an operation in the dialog box displayed on the display unit of the PC 12 to select either "OK" or "Cancel".

If the user clicks on "Cancel" (S815: Cancel), then the process of the rescan program ends. If the user clicks "OK" (S815: OK), the PC 12 returns to the process of S810.

If the card reader drive was found during the above process (S810: found), then in S820 the PC 12 records the drive letter found for the card reader drive in the shared INI file and ends the rescan program.

Since the newly found drive letter is recorded in the shared INI file in S820, the rescan program eliminates the inconsistency between the drive letter recorded in the shared INI file and the actual drive letter.

Effects of the Embodiment

The multifunction peripheral 11 according to the embodiment described above forces the OS of the PC 12 to recognize the multifunction peripheral 11 as a USB storage class device having a single USB-LUN. However, the multifunction peripheral 11 functions as a device having a plurality of SCSI-LUNs when SCSI-compliant data transfers are performed between the PC 12 and multifunction peripheral 11.

By assigning a plurality of different functions (printer function, scanner function, PC-FAX function, and data storage function) to logic units corresponding to the plurality of SCSI-LUNs, the PC 12 can control the logic units having different functions by specifying the corresponding SCSI-LUNs.

Moreover, since the PC 12 recognizes the multifunction peripheral 11 as a USB storage class device having a single USB-LUN when performing data transfers according to the above method, the multifunction peripheral 11 need only be provided with one each of input and output endpoints corresponding to the single USB-LUN.

Hence, unlike a USB compound device having input and output endpoints corresponding to each function, the multifunction peripheral 11 need only have one each of an input endpoint and an output endpoint for all of these functions, thereby reducing the number of endpoints required.

It is not necessary to create a pseudo condition in which one USB device must be disconnected before establishing a connection with another USB device. Hence, the OS of the PC 12 can simultaneously use the plurality of functions without requiring time to switch device drivers.

Further, since the endpoint for control transfers (EP0) is not used for transferring other data, required control can be promptly implemented without interference from other data transfers, even when a large amount of data is being transferred.

Variations of the Embodiments

While the invention has been described in detail with reference to the specific embodiment thereof, it would be apparent to those skilled in the art that many modifications and variations may be made therein without departing from the spirit of the invention, the scope of which is defined by the attached claims.

While the card reader function is assigned to SCSI-LUN=0 in the embodiments described above, a function corresponding to another data storage device may be assigned to the SCSI-LUN-0, such as a function corresponding to another removable disk, CD-ROM drive, hard disk, or magneto-optical disk drive.

In the embodiment described above, the multifunction peripheral 11 returns a response to the PC 12 indicating a SCSI-1-compliant device so that the LUN field in SCSI commands issued by the PC 12 can be used. The multifunction peripheral emulates a SCSI-1-compliant device. However, the present invention is not limited to this configuration. For example, the multifunction peripheral 11 may be configured to return a response to the PC 12 indicating a device with an unknown SCSI version. In this case, the LUN field, which is ignored in SCSI-2 and subsequent versions, can be used without departing from the SCSI standard. The multifunction peripheral 11 emulates a device of an unknown SCSI version.

In the above-described embodiment, the multifunction peripheral 11 is recognized by the PC 12 as having a single USB-compliant logic unit, but having a plurality of SCSI-compliant logic units.

However, the multifunction peripheral 11 may be configured to have a plurality of USB-compliant logic units. Moreover, when employing such a structure, the multifunction peripheral 11 may have a plurality of SCSI-compliant logic units for each of at least one of the plurality of USB-compliant logic unit.

This construction further increases the number of logic units in the multifunction peripheral 11, because the multifunction peripheral 11 is a device of a type whose individually controllable functions are equivalent to the number of logic units.

What is claimed is:

1. A multifunction device having a plurality of functions, including at least a data storage function and a function different from the data storage function, and capable of being connected to a computer via a Universal Serial Bus (USB) interface, the multifunction device comprising:
   a device data outputting unit that outputs information forcing an operating system in the computer to recognize the multifunction device as a USB storage class device having a single USB-compliant logic unit number (LUN) according to the USB standard when establishing a connection with the computer;
   a controlling unit that, when output data including a command in a SCSI-compliant data format is transferred from the computer through a single logical communication path corresponding to the single USB-compliant LUN, determines which one of the plurality of functions the output data is for controlling;
   a USB protocol engine that controls data transfers between the multifunction device and the computer through the single logical communication path;
   a card reader data input-output circuit that acquires the output data transferred from the computer via the USB protocol engine;
   a memory slot that corresponds to the data storage function; and
   a function executing unit that executes the function different from the data storage function,
   wherein the controlling unit comprises a SCSI command analysis unit that receives the output data from the card reader data input-output circuit, analyzes a value of a SCSI-compliant LUN stored in an LUN field provided in the command, determines which one of the plurality of functions the output data controls based on the analyzed value of the SCSI-compliant LUN, and transmits the output data to one of the memory slot and the function executing unit corresponding to the determined function.

2. A multifunction device according to claim 1, wherein the function different from the data storage function includes at least one function selected from among a printer function, scanner function, and facsimile function.

3. A multifunction device according to claim 1, wherein the controlling unit determines that the output data is data for controlling the data storage function when data in the LUN field is 0.

4. A device control system comprising:
   a computer; and
   a multifunction device having a plurality of functions, the plurality of functions including at least a data storage function and a function different from the data storage function, the computer and the multifunction device being connected with each other via a universal serial bus (USB) interface, the multifunction device comprising:
      a device data outputting unit that outputs information forcing an operating system in the computer to recognize the multifunction device as a USB storage class device having a single USB-compliant logic unit number (LUN) according to the USB standard when establishing a connection with the computer; and
      a device controlling unit that, when output data including a command in a SCSI-compliant data format is transferred from the computer through a single logical communication path corresponding to the single USB-compliant LUN, determines which one of the plurality of functions the output data is for controlling;
      a USB protocol engine that controls data transfers between the multifunction device and the computer through the single logical communication path;
      a card reader data input-output circuit that acquires the output data transferred from the computer via the USB protocol engine;
      a memory slot that corresponds to the data storage function; and
      a function executing unit that executes the function different from the data storage function,
      wherein the controlling unit comprises a SCSI command analysis unit that receives the output data from the card reader data input-output circuit, analyzes a value of a SCSI-compliant LUN stored in an LUN field provided in the command, determines which one of the plurality of functions the output data controls based on the analyzed value of the SCSI-compliant LUN, and transmits the output data to one of the memory slot and the function executing unit corresponding to the determined function,
   the computer comprising
      a computer controlling unit that, upon instructed by a data processor functioning on the computer to control one of the plurality of functions of the multifunction device, stores the value corresponding to the function that is the target of control in the LUN field provided in the command and transfers output data including the command to the multifunction device, and
      a USB storage driver, wherein the output data is transferred from the computer controlling unit to the multifunction device via the USB storage driver.

5. A device control system according to claim 4, wherein the function different from the data storage function includes at least one function selected from among a printer function, scanner function, and facsimile function.

6. A device control system according to claim 4, wherein, when recognizing the multifunction device as a USB storage class device according to the USB standard, the operating system provided in the computer recognizes the device as a device having a data storage function and having a value of 0 in the LUN field specified in the SCSI standard when controlling the device; and the device controlling unit of the multifunction device determines that the output data is data for controlling the data storage function when the value in the LUN field is 0.

* * * * *